(12) United States Patent
Sato

(10) Patent No.: US 7,630,143 B2
(45) Date of Patent: Dec. 8, 2009

(54) ZOOM LENS AND IMAGER APPARATUS

(75) Inventor: Kenichi Sato, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 33 days.

(21) Appl. No.: 12/047,983

(22) Filed: Mar. 13, 2008

(65) Prior Publication Data

US 2008/0239505 A1 Oct. 2, 2008

(30) Foreign Application Priority Data

Mar. 30, 2007 (JP) .......................... P2007-093303

(51) Int. Cl.
G02B 15/14 (2006.01)
(52) U.S. Cl. ..................... 359/687; 359/686
(58) Field of Classification Search .......... 359/687, 359/686, 685
See application file for complete search history.

(56) References Cited

U.S. PATENT DOCUMENTS

| | | | |
|---|---|---|---|
| 5,513,034 A | 4/1996 | Sillitto et al. | |
| 7,037,005 B2 | 5/2006 | Kreger et al. | |
| 2006/0082899 A1 | 4/2006 | Kogo | |
| 2009/0027779 A1 * | 1/2009 | Sato | 359/687 |

FOREIGN PATENT DOCUMENTS

| JP | 2000-131610 A | 5/2000 |
|---|---|---|
| JP | 2006-113387 A | 4/2006 |

* cited by examiner

*Primary Examiner*—David N Spector
(74) *Attorney, Agent, or Firm*—Birch, Stewart, Kolasch & Birch, LLP

(57) ABSTRACT

A zoom lens comprises first, second, third and fourth lens groups in order from an object side, so as to change magnification by changing a spacing between the lens groups. The first lens group has a positive refractive power as a whole and comprises, in order from the object side, a negative meniscus lens, a reflecting member that bends an optical path nearly 90 degrees and a positive lens of a resin material having at least one aspheric surface. The second lens group has a negative refractive power as a whole and comprises a negative lens of a resin material on an most object side of the second lens group. A conditional expression given below is satisfied provided that P1 is a focal length of the positive lens of the resin material in the first lens group, and P2 is a focal length of the negative lens of the resin material in the second lens group.

$$1.0 < |P1/P2| < 3.0 \qquad (1).$$

15 Claims, 23 Drawing Sheets

EXAMPLE 1

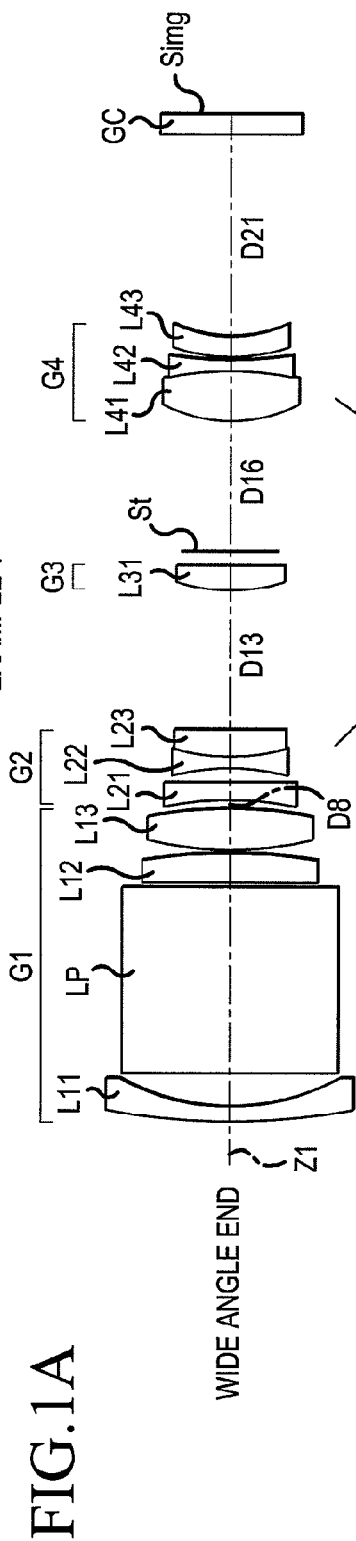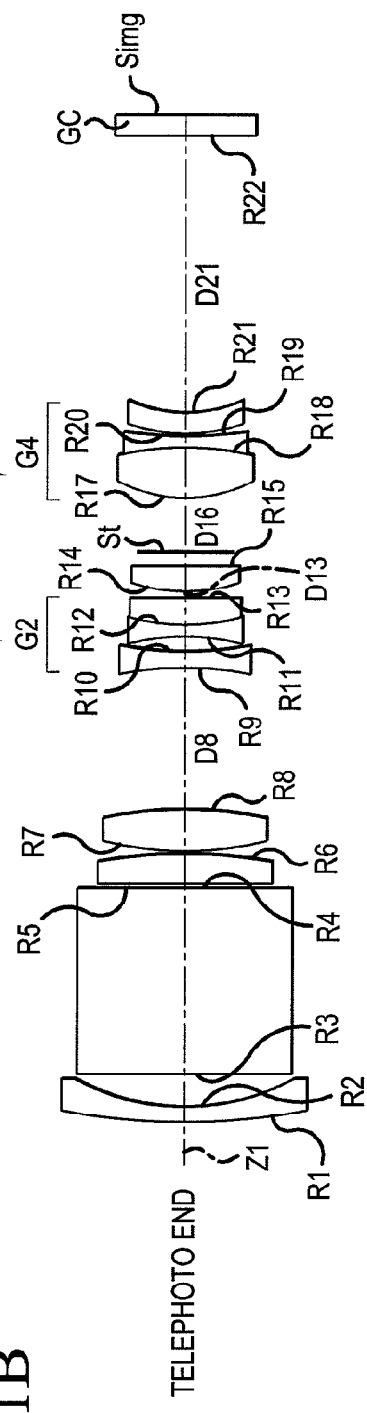

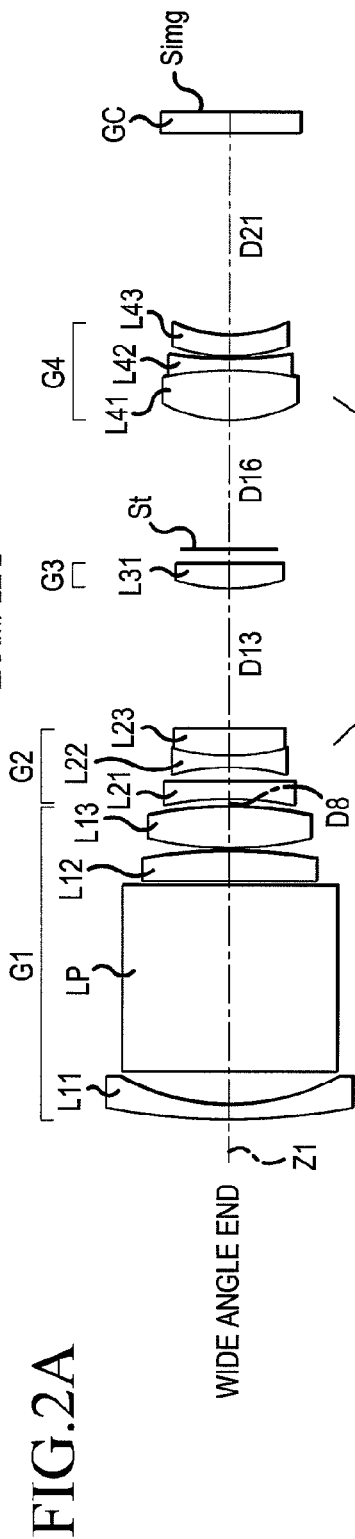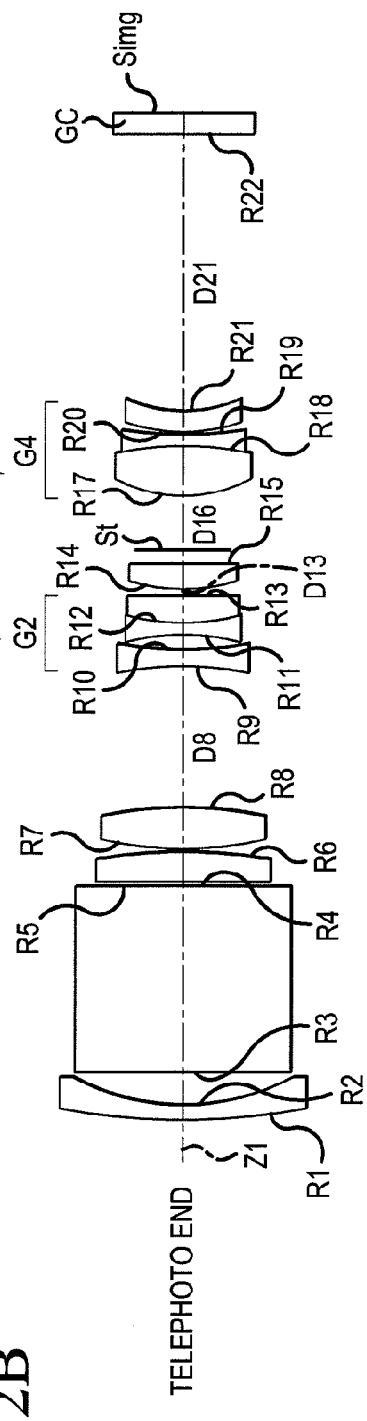

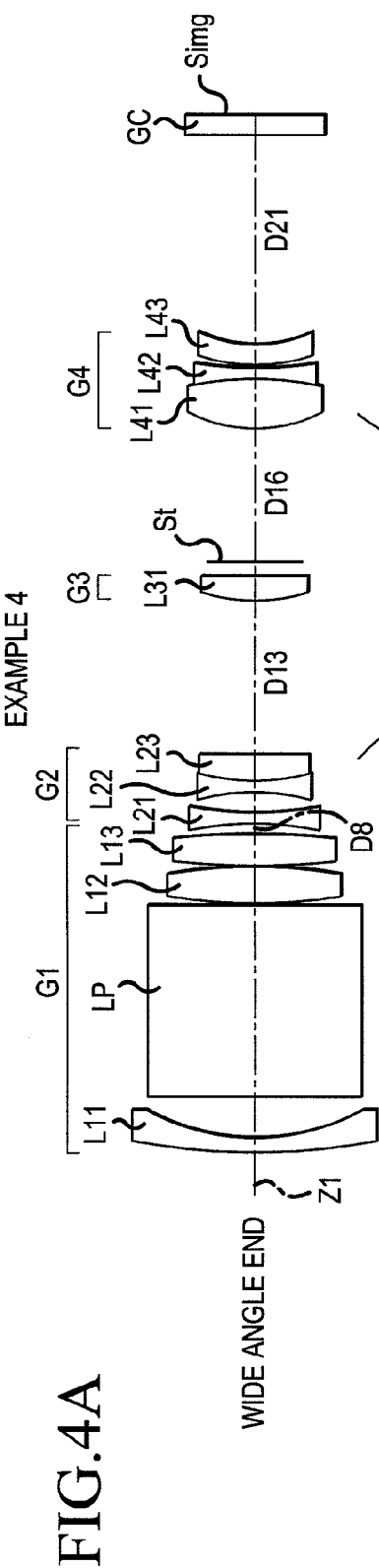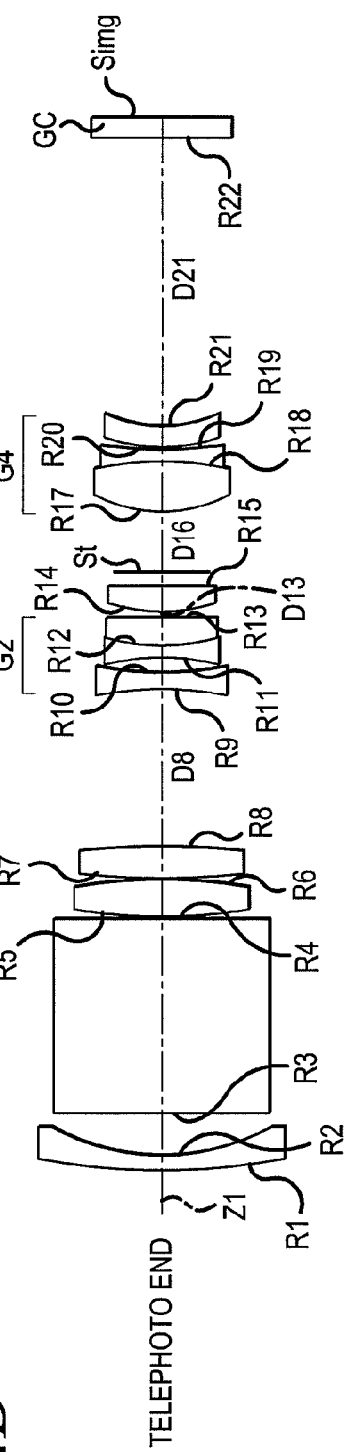

FIG.6A

EXAMPLE 1: BASIC LENS DATA  
AD: APERTURE DIAPHRAGM

| Group | Si (SURFACE NUMBER) | Ri (RADIUS OF CURVATURE) | Di (ON-AXIS SUR-FACE SPACING) | Ndj (REFRACTIVE INDEX) | νdj (ABBE NUMBER) |
|---|---|---|---|---|---|
| G1 | 1 | 30.385 | 0.650 | 2.14352 | 17.8 |
| G1 | 2 | 10.069 | 1.600 | | |
| G1 | 3 | ∞ | 9.100 | 1.92286 | 20.9 |
| G1 | 4 | ∞ | 0.200 | | |
| G1 | 5 | -161.357 | 1.500 | 1.83024 | 26.1 |
| G1 | 6 | -22.291 | 0.150 | | |
| G1 | *7 | 14.200 | 2.000 | 1.51007 | 56.2 |
| G1 | *8 | -19.000 | D8 (VARIABLE) | | |
| G2 | *9 | -16.958 | 0.800 | 1.51007 | 56.2 |
| G2 | *10 | 11.959 | 0.700 | | |
| G2 | 11 | -12.785 | 0.590 | 1.83500 | 43.0 |
| G2 | 12 | 9.631 | 1.300 | 2.14352 | 17.8 |
| G2 | 13 | 30.203 | D13 (VARIABLE) | | |
| G3 | *14 | 8.466 | 1.200 | 1.51007 | 56.2 |
| G3 | *15 | -65.723 | 0.700 | | |
| | 16 (AD) | — | D16 (VARIABLE) | | |
| G4 | 17 | 6.719 | 2.410 | 1.72916 | 54.7 |
| G4 | 18 | -16.900 | 0.600 | 1.92286 | 20.9 |
| G4 | 19 | 16.900 | 0.150 | | |
| G4 | *20 | 16.603 | 1.005 | 1.51007 | 56.2 |
| G4 | *21 | 15.778 | D21 (VARIABLE) | | |
| GC | 22 | ∞ | 0.800 | 1.51680 | 64.2 |
| GC | IMG | ∞ | 0.000 | | |

(*: ASPHERIC)  (f = 6.1 ~ 17.3mm, FNO. = 3.7 ~ 4.3)

FIG.6B

EXAMPLE 1: VARIABLE ON-AXIS SURFACE SPACING DATA

| | D8 | D13 | D16 | D21 |
|---|---|---|---|---|
| WIDE-ANGLE END | 0.400 | 6.931 | 6.334 | 9.815 |
| TELEPHOTO END | 6.926 | 0.405 | 2.631 | 13.518 |

FIG.7

| EXAMPLE 1: ASPHERIC DATA | | | | |
|---|---|---|---|---|
| ASPHERIC COEFFICIENT | SURFACE NUMBER | | | |
| | 7-TH SURFACE | 8-TH SURFACE | 9-TH SURFACE | 10-TH SURFACE |
| KA | 5.3778860E-01 | 2.5238864E+00 | -6.1941384E+01 | 1.1450240E+01 |
| A3 | -2.1964035E-04 | -2.7602131E-04 | — | — |
| A4 | -5.4979023E-05 | -4.4087353E-05 | 3.2838175E-05 | 9.1084119E-04 |
| A5 | -1.1147443E-05 | -7.0222212E-06 | — | — |
| A6 | -1.7842203E-06 | -1..1870866E-06 | -1.0340458E-05 | -1.6119385E-04 |
| A7 | -2.1967415E-07 | -2.8075353E-07 | — | — |
| A8 | -3.7943482E-08 | -4.4695794E-08 | -1.3331778E-06 | 1.6193022E-06 |
| A9 | -7.1522155E-09 | -9.3494559E-09 | — | — |
| A10 | -7.5482606E-10 | -1.5053324E-09 | 1.1615761E-07 | -9.5936776E-09 |
| A11 | -2.5589373E-10 | -2.5875983E-10 | — | — |
| A12 | -4.4777377E-11 | -3.6815467E-11 | — | — |
| A13 | -1.9357438E-11 | -3.7331498E-12 | — | — |
| A14 | -4.4193204E-12 | -2.6716020E-12 | — | — |
| A15 | -1.1321536E-12 | -1.0334008E-12 | — | — |
| A16 | -3.3121136E-13 | -2.9595304E-13 | — | — |
| | 14-TH SURFACE | 15-TH SURFACE | 20-TH SURFACE | 21-TH SURFACE |
| KA | 8.7341550E-01 | -3.2723707E+02 | 1.8946752E+01 | 2.7337034E+01 |
| A3 | — | — | 1.5244972E-03 | 1.5263227E-03 |
| A4 | 1.5256447E-04 | 3.5766020E-04 | 2.0418732E-03 | 4.1604996E-03 |
| A5 | — | — | 2.7029553E-04 | -6.1768393E-05 |
| A6 | 2.3451732E-05 | -3.0176180E-06 | 1.6352921E-05 | 8.8446981E-05 |
| A7 | — | — | -1.3669620E-05 | -5.3405368E-08 |
| A8 | 3.4273859E-07 | 7.6743064E-06 | -2.6527042E-06 | 1.1545035E-05 |
| A9 | — | — | -8.8634200E-07 | -4.2807285E-06 |
| A10 | 2.1999534E-07 | -3.3815263E-07 | 1.9155048E-07 | -2.1313796E-06 |
| A11 | — | — | -3.9586200E-07 | 5.3825630E-07 |
| A12 | — | — | 1.1837994E-07 | -7.7965361E-08 |

FIG. 8A

AD: APERTURE DIAPHRAGM

| | EXAMPLE 2: BASIC LENS DATA | | | |
|---|---|---|---|---|
| Si (SURFACE NUMBER) | Ri (RADIUS OF CURVATURE) | Di (ON-AXIS SURFACE SPACING) | Ndj (REFRACTIVE INDEX) | $\nu$dj (ABBE NUMBER) |
| G1: 1 | 63.6688 | 0.650 | 1.84666 | 23.8 |
| 2 | 9.6023 | 1.600 | | |
| 3 | ∞ | 9.100 | 1.78590 | 44.2 |
| 4 | ∞ | 0.050 | | |
| 5 | 161.6729 | 1.500 | 1.72916 | 54.7 |
| 6 | -19.8118 | 0.150 | | |
| *7 | 17.0000 | 2.000 | 1.51007 | 56.2 |
| *8 | -22.0000 | D8 (VARIABLE) | | |
| G2: *9 | -16.958 | 0.800 | 1.51007 | 56.2 |
| *10 | 11.959 | 0.700 | | |
| 11 | -12.785 | 0.590 | 1.83500 | 43.0 |
| 12 | 9.631 | 1.300 | 1.92286 | 18.9 |
| 13 | 30.203 | D13 (VARIABLE) | | |
| G3: *14 | 8.1426 | 1.200 | 1.51007 | 56.2 |
| *15 | -70.3115 | 0.700 | | |
| 16 (AD) | — | D16 (VARIABLE) | | |
| G4: 17 | 6.9339 | 2.410 | 1.72916 | 54.7 |
| 18 | -16.9000 | 0.600 | 1.92286 | 20.9 |
| 19 | 16.9000 | 0.150 | | |
| *20 | 16.7290 | 1.005 | 1.51007 | 56.2 |
| *21 | 15.8911 | D21 (VARIABLE) | | |
| GC: 22 | ∞ | 0.800 | 1.51680 | 64.2 |
| IMG | ∞ | 0.000 | | |

(* : ASPHERIC)   (f = 6.2 ~ 17.5mm, FNO. = 3.7 ~ 4.3)

FIG. 8B

| EXAMPLE 2: VARIABLE ON-AXIS SURFACE SPACING DATA | | | | |
|---|---|---|---|---|
| | D8 | D13 | D16 | D21 |
| WIDE-ANGLE END | 0.400 | 7.060 | 6.254 | 9.787 |
| TELEPHOTO END | 7.060 | 0.400 | 2.660 | 13.380 |

FIG.9

| EXAMPLE 2: ASPHERIC DATA | | | | |
|---|---|---|---|---|
| ASPHERIC COEFFICIENT | SURFACE NUMBER | | | |
| | 7-TH SURFACE | 8-TH SURFACE | 9-TH SURFACE | 10-TH SURFACE |
| KA | 4.8007780E-01 | 3.1260585E+00 | -6.8097763E+01 | 1.3857346E+01 |
| A3 | -2.6587981E-04 | -3.3940935E-04 | — | — |
| A4 | -5.7029141E-05 | -6.4492691E-05 | 3.8870994E-05 | 7.4652464E-04 |
| A5 | -1.2460805E-05 | -1.0079309E-05 | — | — |
| A6 | -1.9340608E-06 | -1.5138134E-06 | -2.0845826E-06 | -1.2112296E-04 |
| A7 | -2.0382255E-07 | -2.7308414E-07 | — | — |
| A8 | -3.4113388E-08 | -3.6438177E-08 | -1.4931023E-06 | 9.8278660E-07 |
| A9 | -5.0255883E-09 | -5.5934659E-09 | — | — |
| A10 | -2.3020116E-10 | -6.2430889E-10 | 1.0673353E-07 | 2.4178676E-08 |
| A11 | -1.2998196E-10 | -1.1473173E-11 | — | — |
| A12 | 5.8313908E-12 | 1.2987552E-11 | — | — |
| A13 | -1.2510764E-11 | 3.8730042E-12 | — | — |
| A14 | -2.4109319E-12 | -2.9739321E-13 | — | — |
| A15 | -6.2698296E-13 | -6.0972650E-13 | — | — |
| A16 | -1.8236693E-13 | -3.9234319E-13 | — | — |
| | 14-TH SURFACE | 15-TH SURFACE | 20-TH SURFACE | 21-TH SURFACE |
| KA | 7.1228080E-01 | -3.2140053E+02 | 1.9366294E+01 | 2.7671237E+01 |
| A3 | — | — | 1.3874229E-03 | 1.4438906E-03 |
| A4 | 9.8514137E-05 | 3.3045892E-04 | 2.0152712E-03 | 4.0330219E-03 |
| A5 | — | — | 2.6785596E-04 | -7.8899504E-05 |
| A6 | 3.0916724E-05 | -6.2764537E-06 | 1.7042001E-05 | 9.0910625E-05 |
| A7 | — | — | -1.3327132E-05 | 1.2360613E-06 |
| A8 | -2.0548690E-06 | 7.4346517E-06 | -2.6963198E-06 | 1.1568006E-05 |
| A9 | — | — | -1.0009469E-06 | -4.4752535E-06 |
| A10 | 2.7842708E-07 | -4.6097139E-07 | 1.4109167E-07 | -2.2336267E-06 |
| A11 | — | — | -3.8816005E-07 | 5.2522644E-07 |
| A12 | — | — | 1.1946805E-07 | -7.1819301E-08 |

FIG.10A

AD: APERTURE DIAPHRAGM

| | EXAMPLE 3: BASIC LENS DATA | | | | |
|---|---|---|---|---|---|
| | Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| G1 | 1 | 61.3347 | 0.650 | 1.84666 | 23.8 |
| | 2 | 9.7069 | 2.000 | | |
| | 3 | ∞ | 9.100 | 1.78590 | 44.2 |
| | 4 | ∞ | 0.050 | | |
| | 5 | 38.8387 | 1.500 | 1.72916 | 54.7 |
| | 6 | -20.7227 | 0.150 | | |
| | *7 | 23.0000 | 2.000 | 1.51007 | 56.2 |
| | *8 | -32.0000 | D8 (VARIABLE) | | |
| G2 | *9 | -19.2973 | 0.800 | 1.51007 | 56.2 |
| | *10 | 14.3709 | 0.700 | | |
| | 11 | -13.9198 | 0.590 | 1.83500 | 43.0 |
| | 12 | 8.2064 | 1.300 | 1.92286 | 18.9 |
| | 13 | 34.6787 | D13 (VARIABLE) | | |
| G3 | *14 | 8.2973 | 1.200 | 1.51007 | 56.2 |
| | *15 | -69.6359 | 0.700 | | |
| | 16 (AD) | — | D16 (VARIABLE) | | |
| G4 | 17 | 6.9727 | 2.410 | 1.72916 | 54.7 |
| | 18 | -16.9000 | 0.600 | 1.92286 | 20.9 |
| | 19 | 16.9000 | 0.150 | | |
| | *20 | 16.8334 | 1.005 | 1.51007 | 56.2 |
| | *21 | 15.9852 | D21 (VARIABLE) | | |
| GC | 22 | ∞ | 0.800 | 1.51680 | 64.2 |
| | IMG | ∞ | 0.000 | | |

(*: ASPHERIC)  (f = 6.2 ~ 17.6mm, FNO. = 3.7 ~ 4.3)

FIG.10B

| EXAMPLE 3: VARIABLE ON-AXIS SURFACE SPACING DATA | | | | |
|---|---|---|---|---|
| | D8 | D13 | D16 | D21 |
| WIDE-ANGLE END | 0.400 | 7.328 | 6.230 | 9.759 |
| TELEPHOTO END | 7.324 | 0.404 | 2.654 | 13.327 |

FIG.11

| EXAMPLE 3: ASPHERIC DATA | | | | |
|---|---|---|---|---|
| ASPHERIC COEFFICIENT | SURFACE NUMBER | | | |
| | 7-TH SURFACE | 8-TH SURFACE | 9-TH SURFACE | 10-TH SURFACE |
| KA | 6.3728600E-02 | 4.4023711E+00 | -7.7348070E+01 | 1.4112742E+01 |
| A3 | -3.0601946E-04 | -3.9936245E-04 | — | — |
| A4 | -6.6730537E-05 | -7.6556322E-05 | 1.1270980E-05 | 7.5474054E-04 |
| A5 | -1.3071620E-05 | -1.1739378E-05 | — | — |
| A6 | -1.9387168E-06 | -1.7305533E-06 | -4.8934942E-06 | -1.1936848E-04 |
| A7 | -1.8280562E-07 | -2.8867727E-07 | — | — |
| A8 | -2.5932019E-08 | -3.2843261E-08 | -1.0641286E-06 | 1.0010866E-06 |
| A9 | -3.1738858E-09 | -3.3870790E-09 | — | — |
| A10 | 1.4017108E-10 | 9.9136442E-11 | 9.3014190E-08 | 1.4873633E-07 |
| A11 | -6.3431617E-11 | 1.7009250E-10 | — | — |
| A12 | 1.5881565E-11 | 5.2680139E-11 | — | — |
| A13 | -1.0454089E-11 | 9.8358165E-12 | — | — |
| A14 | -1.9224379E-12 | 1.1565058E-13 | — | — |
| A15 | -4.8938526E-13 | -7.6699466E-13 | — | — |
| A16 | -1.3079920E-13 | -4.8640669E-13 | — | — |
| | 14-TH SURFACE | 15-TH SURFACE | 20-TH SURFACE | 21-TH SURFACE |
| KA | 7.1935770E-01 | -2.7227666E+02 | 1.9274846E+01 | 2.7984268E+01 |
| A3 | — | — | 1.3405481E-03 | 1.4909371E-03 |
| A4 | 1.0693874E-04 | 3.3771412E-04 | 2.0273614E-03 | 3.9385747E-03 |
| A5 | — | — | 2.6896119E-04 | -7.1648247E-05 |
| A6 | 3.1374692E-05 | -9.4270045E-06 | 1.7936260E-05 | 9.2873754E-05 |
| A7 | — | — | -1.3321253E-05 | 1.3502819E-06 |
| A8 | -2.5357960E-06 | 7.5131144E-06 | -2.8062138E-06 | 1.1450169E-05 |
| A9 | — | — | -1.0228377E-06 | -4.5254160E-06 |
| A10 | 2.7003318E-07 | -5.1477091E-07 | 1.4081429E-07 | -2.2477190E-06 |
| A11 | — | — | -3.8713435E-07 | 5.1953939E-07 |
| A12 | — | — | 1.1841854E-07 | -7.5933379E-08 |

FIG.12A

AD: APERTURE DIAPHRAGM

| | EXAMPLE 4: BASIC LENS DATA | | | | |
|---|---|---|---|---|---|
| | Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| G1 | 1 | 163.5439 | 0.650 | 1.80810 | 22.8 |
| | 2 | 10.3163 | 1.650 | | |
| | 3 | ∞ | 9.100 | 1.78590 | 44.2 |
| | 4 | ∞ | 0.050 | | |
| | 5 | 29.0659 | 1.500 | 1.75500 | 52.3 |
| | 6 | -20.4862 | 0.150 | | |
| | *7 | 30.0000 | 1.500 | 1.51007 | 56.2 |
| | *8 | -40.0000 | D8 (VARIABLE) | | |
| G2 | *9 | -21.9404 | 0.800 | 1.51007 | 56.2 |
| | *10 | 18.1343 | 0.700 | | |
| | 11 | -14.2967 | 0.590 | 1.83500 | 43.0 |
| | 12 | 7.2049 | 1.300 | 1.92286 | 18.9 |
| | 13 | 23.8840 | D13 (VARIABLE) | | |
| G3 | *14 | 8.3863 | 1.200 | 1.51007 | 56.2 |
| | *15 | -61.6518 | 0.700 | | |
| | 16 (AD) | — | D16 (VARIABLE) | | |
| G4 | 17 | 7.0235 | 2.410 | 1.72916 | 54.7 |
| | 18 | -16.9000 | 0.600 | 1.92286 | 20.9 |
| | 19 | 16.9000 | 0.500 | | |
| | *20 | 17.4170 | 1.005 | 1.59170 | 60.7 |
| | *21 | 16.5106 | D21 (VARIABLE) | | |
| GC | 22 | ∞ | 0.800 | 1.51680 | 64.2 |
| | IMG | ∞ | 0.000 | | |

(*: ASPHERIC)  (f = 6.5 ~ 18.5mm, FNO. = 3.7 ~ 4.3)

FIG.12B

| EXAMPLE 4: VARIABLE ON-AXIS SURFACE SPACING DATA | | | | |
|---|---|---|---|---|
| | D8 | D13 | D16 | D21 |
| WIDE-ANGLE END | 0.400 | 7.364 | 6.308 | 9.518 |
| TELEPHOTO END | 7.360 | 0.404 | 2.716 | 13.106 |

FIG.13

| EXAMPLE 4: ASPHERIC DATA | | | | |
|---|---|---|---|---|
| ASPHERIC COEFFICIENT | SURFACE NUMBER | | | |
| | 7-TH SURFACE | 8-TH SURFACE | 9-TH SURFACE | 10-TH SURFACE |
| KA | -1.8942060E-01 | 7.5703436E+00 | -8.6211071E+01 | 1.6991347E+01 |
| A3 | -3.6421679E-04 | -4.1193923E-04 | — | — |
| A4 | -7.2066169E-05 | -8.4768278E-05 | 7.0591722E-05 | 7.0298646E-04 |
| A5 | -1.5164378E-05 | -1.1572263E-05 | — | — |
| A6 | -2.1961337E-06 | -1.5591236E-06 | -7.0928082E-06 | -8.6496858E-05 |
| A7 | -1.6357855E-07 | -2.5353480E-07 | — | — |
| A8 | -1.0079309E-08 | -2.5386536E-08 | -9.3943440E-07 | 8.3544942E-07 |
| A9 | 1.9741813E-09 | -7.6134865E-10 | — | — |
| A10 | 1.3069938E-09 | 9.7051457E-10 | 7.5488868E-08 | 1.2076215E-07 |
| A11 | 1.4546361E-10 | 4.4457531E-10 | — | — |
| A12 | 4.8252962E-11 | 1.2254808E-10 | — | — |
| A13 | -7.8265556E-12 | 2.3025892E-11 | — | — |
| A14 | -2.1776819E-12 | 1.7516594E-12 | — | — |
| A15 | -5.3748028E-13 | -1.0588492E-12 | — | — |
| A16 | -1.3381325E-13 | -8.0416456E-13 | — | — |
| | 14-TH SURFACE | 15-TH SURFACE | 20-TH SURFACE | 21-TH SURFACE |
| KA | 5.9211290E-01 | -1.3336757E+02 | 1.6099939E+01 | 2.9110498E+01 |
| A3 | — | — | 4.7611387E-04 | 3.5213214E-04 |
| A4 | 7.6862250E-05 | 2.8591357E-04 | 1.8319829E-03 | 3.5090350E-03 |
| A5 | — | — | 2.2068089E-04 | -1.4249583E-04 |
| A6 | 2.9119070E-05 | 1.91182937E-05 | 9.7488180E-06 | 7.7310692E-05 |
| A7 | — | — | -1.3583092E-05 | -2.6362581E-06 |
| A8 | -4.9485033E-06 | 7.9002054E-06 | -2.2513374E-06 | 1.0722965E-05 |
| A9 | — | — | -6.9680336E-07 | -4.4940015E-06 |
| A10 | 3.5352568E-07 | -7.2963555E-07 | 2.5950978E-07 | -2.1500166E-06 |
| A11 | — | — | -3.6532986E-07 | 5.6945842E-07 |
| A12 | — | — | 1.0875208E-07 | -5.9425659E-08 |

FIG.14A

AD: APERTURE DIAPHRAGM

| EXAMPLE 5: BASIC LENS DATA | | | | |
|---|---|---|---|---|
| Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| 1 | 101.2235 | 0.650 | 1.84666 | 23.8 |
| 2 | 10.1051 | 1.650 | | |
| 3 | ∞ | 9.100 | 1.78590 | 44.2 |
| 4 | ∞ | 0.050 | | |
| 5 | 24.3056 | 1.500 | 1.72916 | 54.7 |
| 6 | -18.0450 | 0.150 | | |
| *7 | 40.0000 | 1.500 | 1.51007 | 56.2 |
| *8 | -60.0000 | D8 (VARIABLE) | | |
| *9 | -20.8532 | 0.800 | 1.51007 | 56.2 |
| *10 | 16.5769 | 0.700 | | |
| 11 | -14.7308 | 0.590 | 1.83500 | 43.0 |
| 12 | 7.7601 | 1.300 | 1.92286 | 18.9 |
| 13 | 30.0609 | D13 (VARIABLE) | | |
| *14 | 8.5017 | 1.200 | 1.51007 | 56.2 |
| *15 | -78.4723 | 0.700 | | |
| 16 (AD) | — | D16 (VARIABLE) | | |
| 17 | 7.0586 | 2.410 | 1.72916 | 54.7 |
| 18 | -16.9000 | 0.600 | 1.92286 | 20.9 |
| 19 | 16.9000 | 0.150 | | |
| *20 | 16.9180 | 1.005 | 1.51007 | 56.2 |
| *21 | 16.0615 | D21 (VARIABLE) | | |
| 22 | ∞ | 0.800 | 1.51680 | 64.2 |
| IMG | ∞ | 0.000 | | |

(* : ASPHERIC)  (f = 6.6 ~ 18.6mm, FNO. = 3.9 ~ 4.5)

FIG.14B

| EXAMPLE 5: VARIABLE ON-AXIS SURFACE SPACING DATA | | | | |
|---|---|---|---|---|
| | D8 | D13 | D16 | D21 |
| WIDE-ANGLE END | 0.400 | 7.666 | 6.370 | 10.057 |
| TELEPHOTO END | 7.662 | 0.404 | 2.718 | 13.709 |

FIG.15

| EXAMPLE 5: ASPHERIC DATA | | | | |
|---|---|---|---|---|
| ASPHERIC COEFFICIENT | SURFACE NUMBER | | | |
| | 7-TH SURFACE | 8-TH SURFACE | 9-TH SURFACE | 10-TH SURFACE |
| KA | -2.7028993E+00 | 4.2591490E+00 | -8.0146166E+01 | 1.5397395E+01 |
| A3 | -3.9995307E-04 | -4.4906582E-04 | — | — |
| A4 | -7.8829538E-05 | -8.1999458E-05 | 2.7900344E-05 | 7.0262646E-04 |
| A5 | -1.4813923E-05 | -1.1869070E-05 | — | — |
| A6 | -2.0387917E-06 | -1.6548952E-06 | -6.8828088E-06 | -9.5966272E-05 |
| A7 | -1.4316898E-07 | -2.5828224E-07 | — | — |
| A8 | -1.0296897E-08 | -2.2700698E-08 | -9.1945314E-07 | 1.3341575E-06 |
| A9 | 1.4421378E-09 | -2.0467956E-10 | — | — |
| A10 | 1.1385030E-09 | 1.0253753E-09 | 7.6311693E-08 | 9.5570655E-08 |
| A11 | 1.2237683E-10 | 4.1257045E-10 | — | — |
| A12 | 5.0830393E-11 | 1.0883999E-10 | — | — |
| A13 | -5.9368983E-12 | 2.0692674E-11 | — | — |
| A14 | -1.3163608E-12 | 1.5252413E-12 | — | — |
| A15 | -3.3735532E-13 | -8.5317650E-13 | — | — |
| A16 | -1.0391854E-13 | -6.4055548E-13 | — | — |
| | 14-TH SURFACE | 15-TH SURFACE | 20-TH SURFACE | 21-TH SURFACE |
| KA | 6.3829450E-01 | -2.2457347E+02 | 1.8875249E+01 | 2.8513824E+01 |
| A3 | — | — | 1.2838394E-03 | 1.3368176E-03 |
| A4 | 8.7698368E-05 | 3.1519876E-04 | 2.0661718E-03 | 3.9124795E-03 |
| A5 | — | — | 2.7279971E-04 | -6.7176474E-05 |
| A6 | 3.0511561E-05 | -1.6573731E-05 | 1.7645674E-05 | 8.9358122E-05 |
| A7 | — | — | -1.3922942E-05 | -1.0429636E-06 |
| A8 | -4.6996236E-06 | 7.4603812E-06 | -3.0578615E-06 | 1.0809924E-05 |
| A9 | — | — | -1.0642191E-06 | -4.5664805E-06 |
| A10 | 2.9574514E-07 | -7.0959553E-07 | 1.5542790E-07 | -2.2076300E-06 |
| A11 | — | — | -3.7470936E-07 | 5.3558233E-07 |
| A12 | — | — | 1.2112300E-07 | -7.7969993E-08 |

FIG.16

| | CONDITIONAL-EXPRESSION RELATED VALUE | | | |
|---|---|---|---|---|
| | \|P1/P2\| | \|f2/fw\| | Nd1 | Nd2 |
| EXAMPLE 1 | 1.19 | 1.08 | 2.14352 | 2.14352 |
| EXAMPLE 2 | 1.25 | 1.07 | 1.84666 | 1.92286 |
| EXAMPLE 3 | 1.65 | 1.10 | 1.84666 | 1.92286 |
| EXAMPLE 4 | 1.75 | 1.06 | 1.80810 | 1.92286 |
| EXAMPLE 5 | 2.63 | 1.10 | 1.84666 | 1.92286 |

EXAMPLE 1: WIDE-ANGLE END

EXAMPLE 1: TELEPHOTO END

EXAMPLE 2: WIDE-ANGLE END

SPHERIC ABERRATION

ASTIGMATISM

DISTORTION

EXAMPLE 2: TELEPHOTO END

SPHERIC ABERRATION

ASTIGMATISM

DISTORTION

EXAMPLE 3: WIDE-ANGLE END

SPHERIC ABERRATION

ASTIGMATISM

DISTORTION

EXAMPLE 3: TELEPHOTO END

SPHERIC ABERRATION

ASTIGMATISM

DISTORTION

EXAMPLE 4: WIDE-ANGLE END

SPHERIC ABERRATION

ASTIGMATISM

DISTORTION

EXAMPLE 4: TELEPHOTO END

SPHERIC ABERRATION

ASTIGMATISM

DISTORTION

EXAMPLE 5: WIDE-ANGLE END

EXAMPLE 5: TELEPHOTO END

ZOOM LENS AND IMAGER APPARATUS

BACKGROUND OF THE INVENTION

1. Field of the Invention

The present invention relates to a zoom lens and imager apparatus to be suitably used on a small-sized apparatus having an imaging function, particularly a digital still camera, a camera-equipped cellular phone, a personal digital assistant (PDA) or the like.

2. Description of the Related Art

Recently, size reduction is further demanded for the imager apparatuses, such as digital still cameras, in the entirety thereof as size reduction proceeds in the imaging devices, such as CCDs (charge coupled devices), CMOSs (complementary metal oxide semiconductors) . Development has been made recently on those reduced in thickness upon being mounted to an imager apparatus by bending the optical path of a lens system into so-called a bending optical system.

As a zoom lens using a bending optical system, JP-A-2000-131610 describes a zoom lens structured with a first lens group having a positive refractive power, a second lens group having negative refractive power, a third lens group having a positive refractive power and a fourth lens group having a positive refractive power whereby magnification can be changed by moving the negative second lens group and the positive fourth lens group. In the zoom lens, the optical path is bent approximately 90 degrees by arranging a prism within the first lens group. Within the first lens group, a fixed positive lens group is arranged in back of the prism.

Because the use of a bending optical system can reduce the thickness upon being mounted to an imager apparatus as described above, the recent tendency is toward mounting on various imager apparatuses. Meanwhile, there is a demand for thickness and cost reduction in the market. For this reason, development is desired for a bending optical system structured favorable in terms of cost while being reduced in thickness. In order to reduce the cost, it can be considered to use a resin material for the lens. However, where a resin lens is used, temperature characteristics are structurally taken into account to a full extent because characteristic change is significant with temperature as compared to the glass lens. In the conventional bending optical systems, e.g. four-grouped zoom structure as described in JP-A-2000-131610, those are known which use resin lenses in the third or fourth lens group, for example. However, it can be considered to actively use resin lenses in other lens groups in an attempt to reduce the cost furthermore.

SUMMARY OF THE INVENTION

The present invention, made in view of the foregoing circumstance, aims at providing a zoom lens and imager apparatus that cost reduction can be achieved while maintaining the size small and the optical characteristics well.

According to the present invention, there is provided a zoom lens comprising a first lens group, a second lens group, a third lens group and a fourth lens groups in order from an object side, so as to change magnification by changing a spacing between the lens groups, wherein the first lens group has a positive refractive power as a whole and comprises, in order from the object side, a negative meniscus lens, a reflecting member that bends an optical path nearly 90 degrees and a positive lens of a resin material having at least one aspheric surface; the second lens group has a negative refractive power as a whole and comprises a negative lens of a resin material on an most object side of the second lens group; the third lens group has a positive lens having a convex surface directed to the object side; and the fourth lens group has a positive refractive power as a whole and comprises an aspheric lens having at least one aspheric surface; wherein a conditional expression given below is satisfied. In the expression, P1 is a focal length of the positive lens of the resin material in the first lens group, and P2 is a focal length of the negative lens of the resin material in the second lens group.

$$1.0 < |P1/P2| < 3.0 \tag{1}$$

In the zoom lens of the invention, because a bending optical system is structured to bend the optical path by a reflecting member arranged within the first lens group, the optical system is suppressed in the thickness direction thereof while maintaining the optical characteristics well, This makes it easy to reduce the thickness upon mounting to an imager apparatus. The proper use of resin lenses in the first and second lens group facilitates the cost down while maintaining the size small and the optical characteristics well. Particularly, because the resin lens of the first lens group is provided as the positive lens and the resin lens of the second lens group is provided as the negative lens wherein the conditional expression is properly satisfied as to the focal length of the resin lens, the resin lenses of the first and second lens groups are to act in a manner compensating for temperature mutually. Despite cost reduction is achieved with use of the resin lenses, the characteristic variation due to temperature change can be suppressed well.

By properly employing and satisfying the following preferable structure, the optical characteristics are provided more favorable thus providing an advantage in terms of cost reduction.

In the zoom lens of the invention, a conditional expression given below is preferably satisfied. In the expression, fw is a focal length of the zoom lens at a wide-angle end, and f2 is a focal length of the second lens group.

$$0.8 < |f2/fw| < 1.2 \tag{2}$$

In the zoom lens of the invention, a conditional expression given below may be suitably satisfied, wherein Nd1 is a refractive index, at d-line, of the negative meniscus lens on the most object side within the first lens group, and Nd7 is a refractive index, at d-line, of the lens on the most image side within the second lens group.

$$2.1 < Nd1 \tag{3}$$

$$2.1 < Nd7 \tag{4}$$

In the zoom lens of the invention, the aspheric lens in the fourth lens group is preferably a positive or negative meniscus lens, arranged on an most image side within the fourth lens group, that has at least one aspheric surface.

In the zoom lens of the invention, the positive lens of the third lens group may be formed of a resin material. Meanwhile, the aspheric lens of the fourth lens group may be formed of a resin material.

An imager apparatus according to the invention comprises: the zoom lens set forth in the invention; and an imaging device that outputs an imaging signal commensurate with the optical image formed by the zoom lens.

With the imager apparatus of the invention, the apparatus overall is provided small in size and low in cost by the use of the zoom lens of the invention that is small in size, low in cost and high in characteristic.

BRIEF DESCRIPTION OF THE DRAWINGS

FIG. 1 is a lens sectional view corresponding to example 1, showing a first structural example of a zoom lens according to an embodiment of the present invention;

FIG. 2 is a lens sectional view corresponding to example 2, showing a second structural example of a zoom lens according to the embodiment of the invention;

FIG. 4 is a lens sectional view corresponding to example 4, showing a fourth structural example of a zoom lens according to the embodiment of the invention;

FIG. 6 are figures showing the lens data on the zoom lens of example 1, wherein FIG. 6A shows the basic lens data while FIG. 6B shows the surface-to-surface data in a region to move due to magnification change;

FIG. 7 is a figure showing the data concerning an aspheric surface of the zoom lens of example 1;

FIG. 8 are figures showing the lens data on the zoom lens of example 2, wherein FIG. 8A shows the basic lens data while FIG. 8B the surface-to-surface data in a region to move due to magnification change;

FIG. 9 is a figure showing the data concerning an aspheric surface of the zoom lens of example 2;

FIG. 10 are figures showing the lens data on the zoom lens of example 3, wherein 10A shows the basic lens data while 10B the surface-to-surface data in a region to move due to magnification change;

FIG. 11 is a figure showing the data concerning an aspheric surface of the zoom lens of example 3;

FIG. 12 are figures showing the lens data on the zoom lens of example 4, wherein FIG. 12A shows the basic lens data while FIG. 12B the surface-to-surface data in a region to move due to magnification change;

FIG. 13 is a figure showing the data concerning an aspheric surface of the zoom lens of example 4;

FIG. 14 are figures showing the lens data on the zoom lens of example 5, wherein FIG. 14A shows the basic lens data while FIG. 14B shows the surface-to-surface data in a region to move due to magnification change;

FIG. 15 is a figure showing the data concerning an aspheric surface of the zoom lens of example 5;

FIG. 16 is a figure showing the values collectively on each of the examples;

FIG. 17 are aberration diagrams showing aberrations at the wide-angle end of the zoom lens of example 1, wherein

FIG. 18 are aberration diagrams showing aberrations at the telephoto end of the zoom lens of example 1, wherein

FIG. 19 are aberration diagrams showing aberrations at the wide-angle end of the zoom lens of example 2, wherein

FIG. 20 are aberration diagrams showing aberrations at the telephoto end of the zoom lens of example 2, wherein

FIG. 21 are aberration diagrams showing aberrations at the wide-angle end of the zoom lens of example 3, wherein

FIG. 22 are aberration diagrams showing aberrations at the telephoto end of the zoom lens of example 3, wherein

FIG. 23 are aberration diagrams showing aberrations at the wide-angle end of the zoom lens of example 4, wherein

FIG. 24 are aberration diagrams showing aberrations at the telephoto end of the zoom lens of example 4, wherein

FIG. 25 are aberration diagrams showing aberrations at the wide-angle end of the zoom lens of example 5, wherein

FIG. 26 are aberration diagrams showing aberrations at the telephoto end of the zoom lens of example 5, wherein

DETAILED DESCRIPTION OF THE INVENTION

Figure 3A:
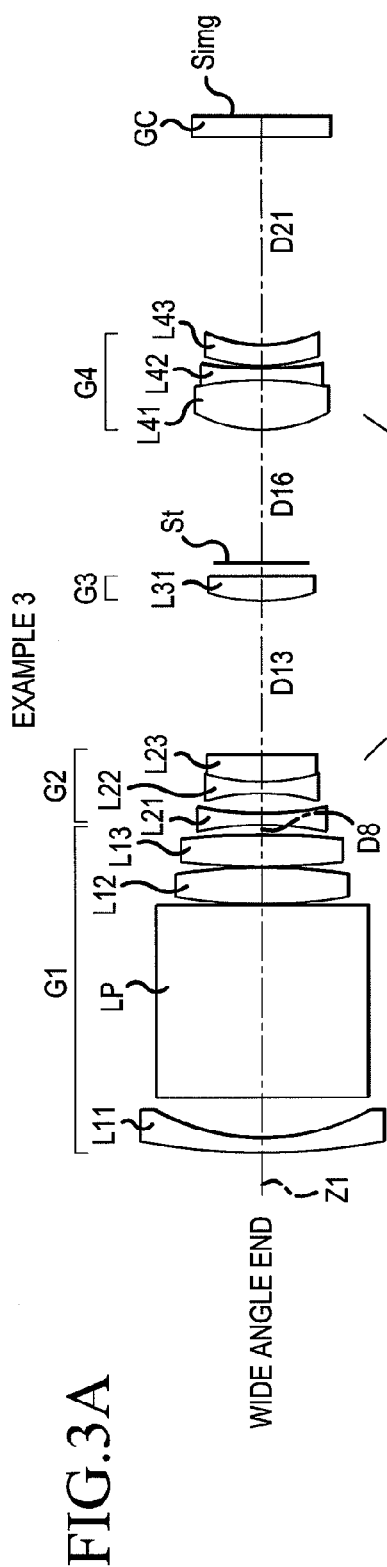
FIG. 3 is a lens sectional view corresponding to example 3, showing a third structural example of a zoom lens according to the embodiment of the invention.
Figure 3B:
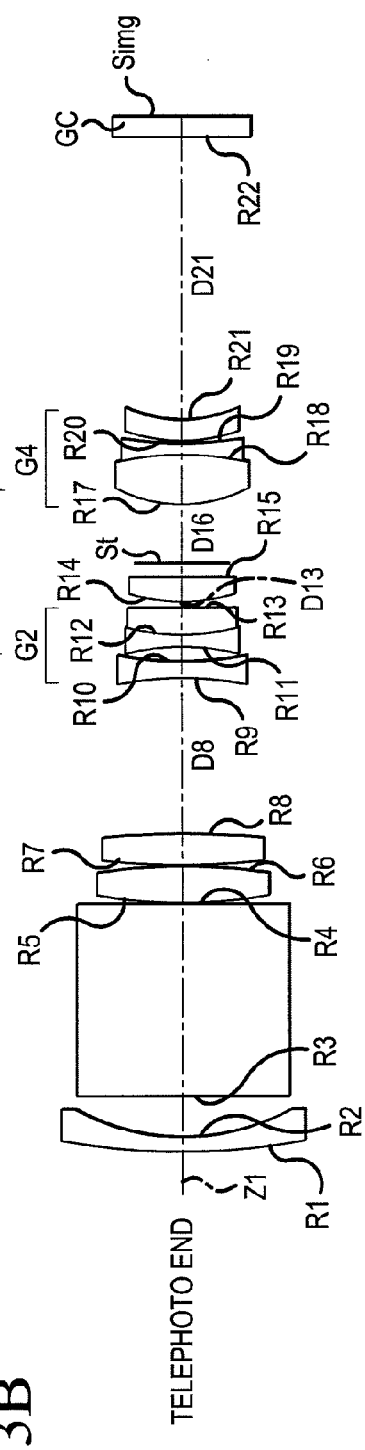
Figure 5A:
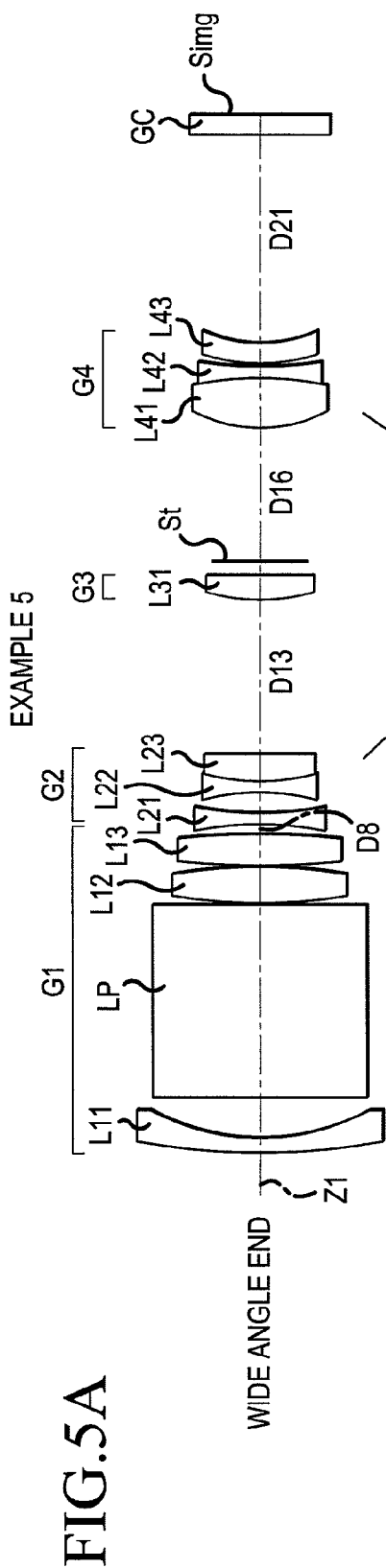
FIG. 5 is a lens sectional view corresponding to example 5, showing a fifth structural example of a zoom lens according to the embodiment of the invention.
Figure 5B:
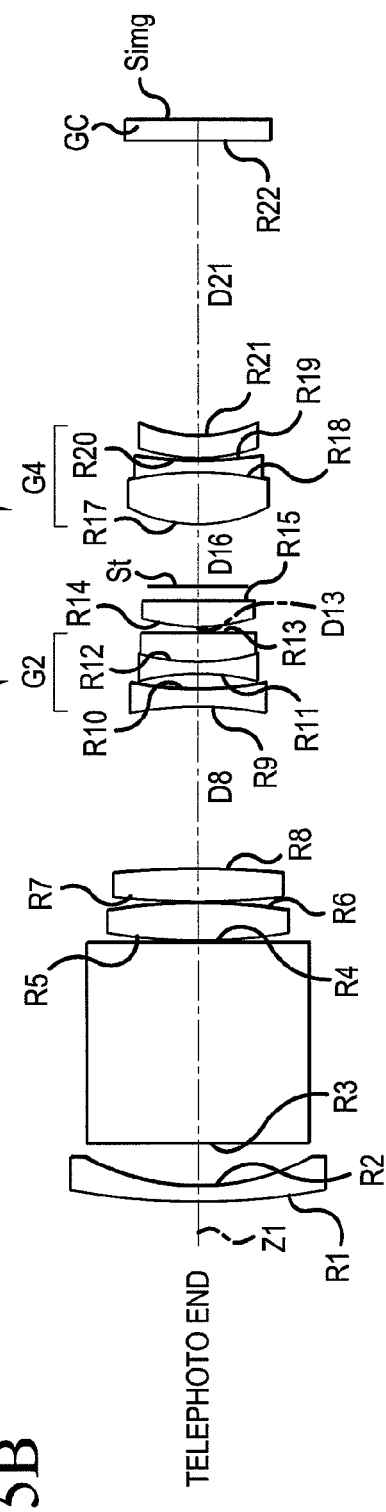

With reference to the drawings, explanation will be now made in detail on an embodiment according to the present invention.

FIGS. 1A and 1B show a first structural example of a zoom lens according to an embodiment of the invention. This structural example corresponds to a first numerical example (FIGS. 6A, 6B and 7) of a lens arrangement, referred later. FIG. 1A corresponds to an optical system arrangement at the wide-angle end (at the smallest focal length) while FIG. 1B to an optical system arrangement at the telephoto end (at the greatest focal length). Likewise, FIGS. 2A to 5B show the sectional arrangements of the second to fifth structural examples corresponding to the lens arrangements of the second to fifth numerical examples, referred later. In FIGS. 1A to 5B, reference character Ri represents a radius-of-curvature of an i-th surface taken in a manner gradually increasing toward the image side rd the imaging side) with the closest surface of the constituent element to the object side taken as the first. Reference character Di represents a on-axis surface spacing on an optical axis Z1 between the i-th Surface and the (i+1)-th surface. Note that the reference character Di is attached only for on-axis surface spacings D8, D13, D16, D21 that are changed with the change of magnification. The ensuing explanation is based on the first structural example shown in FIGS. 1A and 1B because the structural examples are basically identical in arrangement.

The zoom lens is for use on a small-sized apparatus having an imaging function, e.g. a digital still camera (FIGS. 28 and 29) as referred later, a camera-equipped cellular phone or a PDA. The zoom lens includes, on the optical axis Z1, a first lens group G1, a second lens group G2, a third lens group G3, an aperture diaphram St for adjusting the amount of light, and a fourth lens group G4, in order from an object side.

The zoom lens is arranged with an imaging device not shown, such as a CCD, on the image surface Simg thereof. The imaging device is to output an image signal commensurate with the optical image formed by the zoom lens. At least the zoom lens and the imaging device constitute an imager apparatus in the present embodiment. Between the fourth lens group G4 and the imaging device, various optical members GC may be arranged in accordance with the construction of the camera on which the lens is to be mounted. For example, a plate-like optical member may be arranged, e.g. a cover glass for image surface protection or an infrared absorbing filter.

In the zoom lens, magnification is to be changed by changing the spacing between the groups. Specifically, during magnification change, the first and third lens groups G1, G3 are fixed at all times whereas the second and fourth lens groups G2, G4 are to move on the optical axis Z. In the zoom lens, as magnification is changed from the wide angle end to the telephoto end, the movable groups move from the state of FIG. 1A into the state of FIG. 1B in a manner depicting a path shown with a solid line in the figure. In this case, the second lens group G2 mainly serves for magnification change function while the fourth lens group G4 for correcting function for the variation-on-image surface caused by the magnification change.

The zoom lens has resin lenses at least in the first and second lens groups G1, G2. Where required, resin lenses may be provided in any one or in both of the third and fourth lens groups G3, G4. If required, aspheric lenses may be used in the lens groups. In the case the lens is made aspheric, workability is obtained well and cost reduction is achieved if formed by use of a resin material. Thus, the aspheric lenses are preferably resin lenses.

The first lens group G1 wholly has a positive refractive power. The first lens group G1 has a negative meniscus lens, a reflecting member for bending the optical path by approximately 90 degrees, and a positive formed aspheric at least at its one surface and of a resin material, in the order from the object side. Specifically, as shown in FIGS. 1A and 1B, the first lens group G1 is structured with a negative meniscus lens L11 having a convex surface directed to the object, a rectangular prism LP as a reflecting member and two positive lenses L12, L13, in the order from the object side. In the first lens group G1, the positive lens L13 on the most image side is preferably a resin lens.

Figure 27:
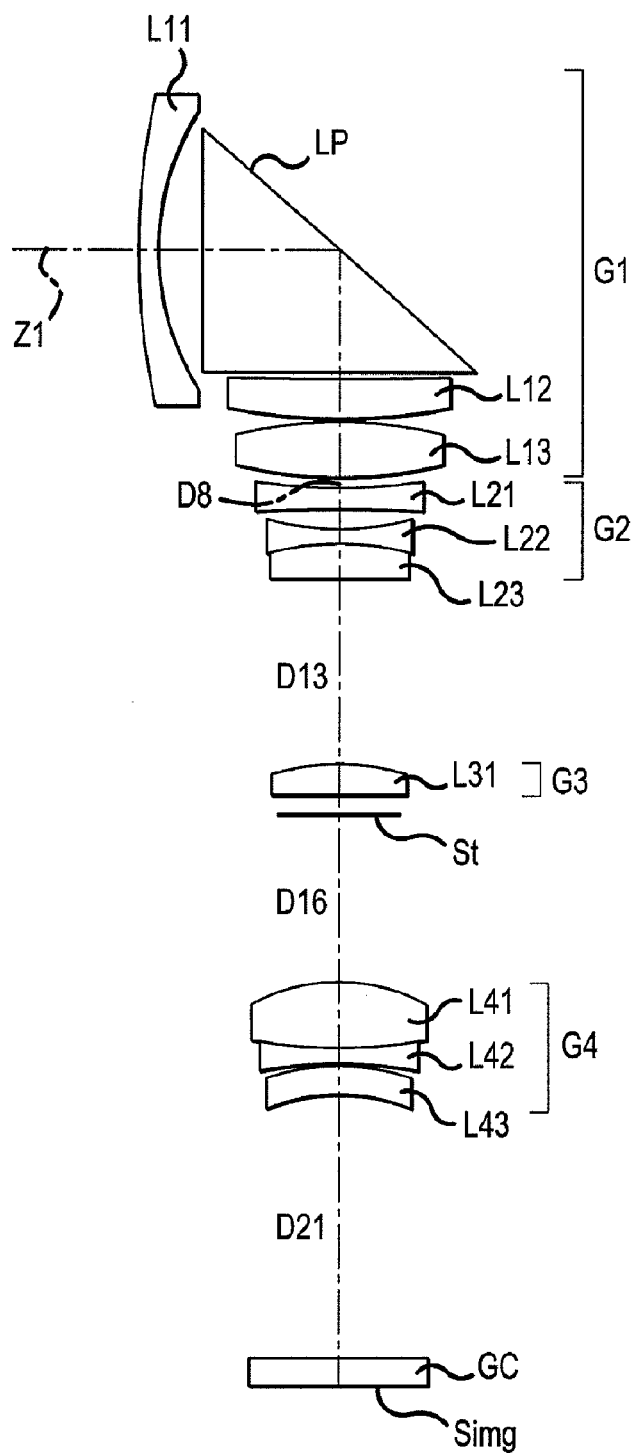
FIG. 27 is an explanatory view of a bending optical system.

Incidentally, the zoom lens in this embodiment is a bending optical system. In actual, as shown in FIG. 27, the optical path is bent approximately 90 degrees, for example, by the internal reflection surface of the rectangular prism LP in the first lens group G1. In FIGS. 1A to 5B, showing is made with expansion in the direction of the optical axis Z1 with the internal reflection surface of the prism LP omitted. Note that another type of a reflecting member, such as a reflection mirror, may be used in place of the rectangular prism LP.

The second lens group G2 wholly has a negative refractive power. The second lens group G2 has, on the most object side, a negative lens formed of a resin material. Specifically, as shown in FIGS. 1A and 1B, the second lens group G2 is structured with a biconcave negative lens L21 formed of a resin material and a cemented lens formed by a biconcave negative lens L22 and a positive lens L23, in order from the object side.

The third lens group G3 has a positive lens having a convex surface directed to the object side thereof. Specifically, as shown in FIGS. 1A and 1B, the third lens group G3 is structured by one positive lens L31 having a convex surface, for example, directed to the object side thereof. The positive lens L31 is preferably an aspheric lens of a resin material.

The fourth lens group G4 wholly has a positive refractive power, having an aspheric lens formed aspheric at least at the one surface thereof. Within the fourth lens group G4, the lens on the most image side is preferably a positive or negative meniscus lens formed aspheric at least at one surface. thereof. Specifically, as shown in FIGS. 1A and 1B, the fourth lens group G4 is structured with a cemented lens formed by two lenses L41, L42 and a positive or negative lens L43 having a convex surface directed to the object side, in order from the object side. For example, the positive or negative lens is preferably an aspheric lens of a resin material.

The zoom lens satisfies the following conditional expression (1). In the expression, P1 is a focal length of the resin lens (positive lens L13) in the first lens group G1 while P2 is a focal length of the resin lens (negative lens L21) in the second lens group G2.

$$1.0 < |P1/P2| < 3.0 \quad (1)$$

The zoom lens also preferably satisfies the following conditional expression (2). In the expression, fw shows a focal length of the overall system at the wide-angle end while f2 a focal length of the second lens group G2.

$$0.8 < |f2/fw| < 1.2 \quad (2)$$

The zoom lens, on the other hand, may suitably satisfy the following conditional expressions. In this case, Nd1 is a refractive index, at d-line, of the negative meniscus lens. L11 of the first lens group G1 on the most object side while Nd7 is a refractive index, at d-line, of the lens L23 of the second lens group G2 on the most image side.

$$2.1 < Nd1 \quad (3)$$

$$2.1 < Nd7 \quad (4)$$

Figure 28:
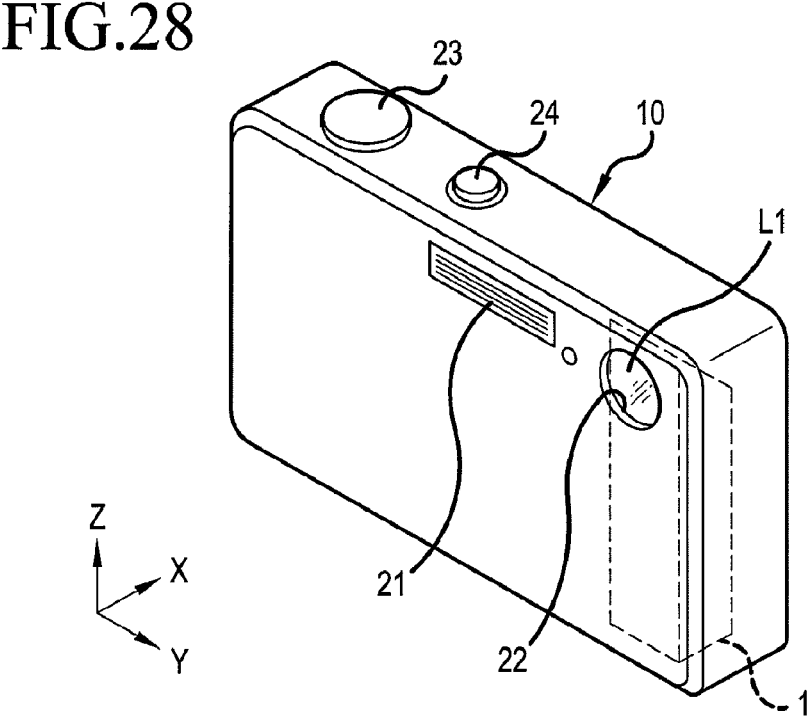
FIG. 28 is a front exterior view showing a structural example of a digital camera as an imager apparatus according to an embodiment of the invention.
Figure 29:
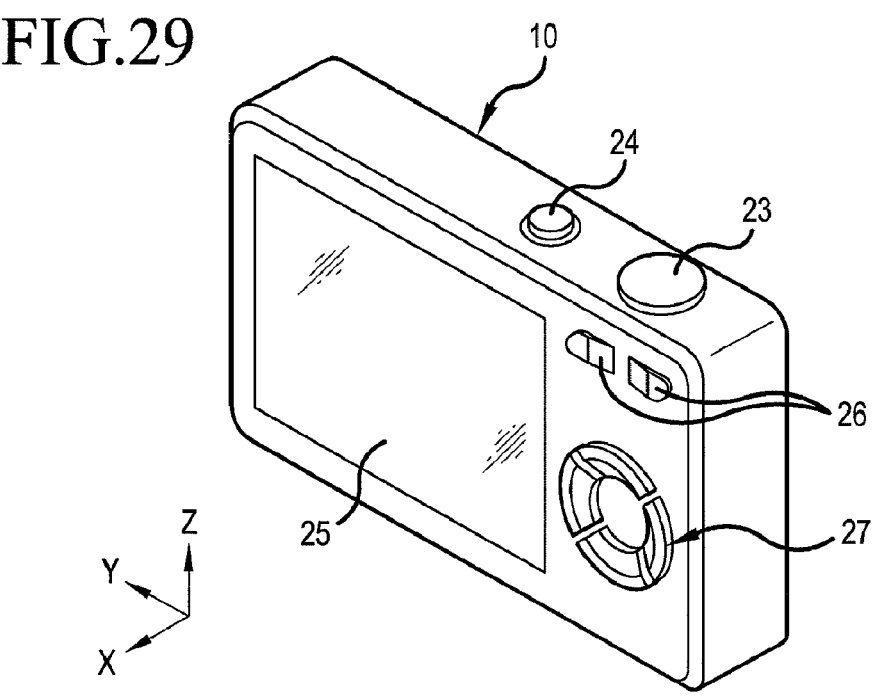
FIG. 29 is a back exterior view showing a structural example of the digital camera as the imager apparatus according to the embodiment of the invention.

FIGS. 28 and 29 show a digital camera as an example of an imager apparatus on which the zoom lens is to be mounted. FIG. 28 illustrates an exterior view of the digital camera 10 as viewed from front while FIG. 29 an exterior view of the digital camera 10 as viewed from back. The digital camera 10 is equipped with a electronic flash emitting portion 21 for giving off electronic flash light, at a central upper on the front surface thereof. Meanwhile, a photographic aperture 22 is provided laterally of the electronic flash emitting portion 21 on the front surface, through which light comes from a photographic subject. The digital camera 10 also has a release button 23 and a power button 24, on the upper surface thereof. The digital camera 10 also has a display 25 and operating parts 26, 27, on the back surface thereof The display 25 is to display an image taken. In the digital camera 10, a still image in an amount of one frame is taken by pressing the release button 23. The image data, obtained by such photographing, is recorded in a memory card (not shown) loaded on the digital camera 10.

The digital camera 10 has an imaging lens 1 in the housing thereof. The zoom lens according to the present embodiment is used as the imaging lens 1. The imaging lens 1 is arranged such that the lens (negative meniscus lens L11) on the most object side lies at the photographic aperture 22 provided in the front surface thereof. The photographic lens 1 is incorporated longitudinally in the entire thereof within the digital camera 10 such that the optical axis Z1, bent by the rectangular prism LP, aligns with the longitudinal direction of the camera body. Incidentally, it may be incorporated sideways in the entire thereof within the digital camera 10 such that the optical axis Z1, bent by the rectangular prism LP, aligns with the sideway direction of the camera body.

Incidentally, the zoom lens of the present embodiment is not limited to the digital camera but can be mounted on an information apparatus (PDA or the like) in various kinds having a photographic function or on a video camera.

Now explanation is made on the function and effect of the zoom lens constructed as above.

The zoom lens is structured as a bending optical system that the optical path is bent by the reflecting member arranged within the first lens group G1. Due to this, the optical system is suppressed in the thickness direction while maintaining the optical characteristics well, thus facilitating the thickness reduction upon being mounted to an imaging apparatus. The suitable use of resin lenses in the first and second lens groups G1, G2 facilitates the cost reduction while maintaining the size small and the optical characteristics well. Particularly, because the resin lens of the first lens group G1 is provided as the positive lens L13 and the resin lens of the second lens group G2 is provided as the negative lens L21 wherein the conditional expression (1) is properly satisfied as to the focal length of the resin lens, the resin lenses of the first and second lens groups G1, G2 act to compensate for temperature mutually. Despite cost reduction is achieved with use of the resin lenses, the characteristic variation due to temperature change can be suppressed well. Meanwhile, cost reduction is achieved furthermore by using resin lenses in any one or in both of the third and fourth lens groups G3, G4 as required. Besides, aberration correction is made advantageous by using aspheric lenses in the lens groups as required. In such a case, by providing the aspheric lenses as resin lenses, fabrication is facilitated as compared to the glass aspheric lens. This can achieve cost reduction while improving the characteristic.

The conditional expression (1) represents the absolute value of the ratio between a focal length of the resin lens of the first lens group G1 and a focal length of the resin lens of the second lens group G2. If outside the range, deterioration results in the temperature characteristics.

The conditional expression (2) represents the absolute value of the ratio between a focal length f2 of the second lens group G2 and a focal length fw at the wide-angle end. If below the lower limit of the conditional expression (2), the power increases on the second lens group G2 thus unpreferably increasing excessively the sensitivity of errors. Meanwhile, if above the upper limit of the conditional expression (2), the moving amount of the second lens group G2 increases excessively during magnification change thus unpreferably increasing the size of the lens system.

The conditional expression (3) concerns the refractive index of the negative meniscus lens L11 of the first lens group G1 on the most object side. The conditional expression (4) concerns the refractive index of the lens L23 of the second lens group G2 on the most image side. By using a lens with a high refractive index that satisfies the conditional expressions (3), (4) and has a refractive index exceeding 2.1, correction is made easy for aberration, e.g. curvature of field. Meanwhile, the use of a lens with a high refractive index makes it possible to reduce the thickness thereof, which is advantageous in size reduction. Particularly, in the bending optical system, the lens L11 of the first lens group G1 on the most object side tends to have an increased size. By using a material high in refractive index for the lens L11, size and thickness reduction can be achieved effectively.

As explained so far, according to the zoom lens of the present embodiment, a zoom optical system can be realized low in cost while maintaining the size small and the optical characteristics well by properly using resin lenses in the groups.

EXAMPLES

Now explanation is made on concrete numerical examples of the zoom lens according to the present embodiment. In the following, the first to fifth numerical examples will be explained collectively.

FIGS. 6A, 6B and 7 show the concrete lens data corresponding to the zoom lens structure shown in FIGS. 1A and 1B. Particularly, FIG. 6A shows the basic lens data while FIGS. 6B and 7 show the other data. The column of surface number Si in the lens data shown in FIG. 6A, there is shown a number of the i-th surface (i=1-22) of the zoom lens of example 1 as counted to increase toward the image side with the surface of the constituent element on the most object side taken as the first. In the column of radius of curvature Ri, there is shown a value (mm) of radius of curvature of the i-th surface from the object side correspondingly to the character Ri attached in FIG. 1. In the column of on-axis surface spacing Di, there is shown a spacing (mm) on the optical axis between the i-th surface Si and the (i+1)-th surface Si+1 that are similarly taken from the object side. In the column of Ndj, there is shown a value of refractive index at d-line (587.6 nm) of the j-th optical element taken from the object side. In the column of vdj, there is shown a value of Abbe number at d-line (587.6 nm) of the j-th optical element taken from the object side, In FIG. 6A, there are also shown various ones of data, i.e. paraxial focal length f (mm) of the overall system at the wide-angle and telephoto ends and a value of F number (FNO.).

The zoom lens of example 1 is structured with a lens L13 on the most image side within the first lens group G1, a lens L21 on the most object side within the second lens group G2, a lens L31 of the third lens group G3 and a lens L43 on the most image side within the fourth lens group G4.

In the zoom lens of example 1, because the second and fourth lens groups G2, G4 is axially moved by changing the magnification change, the on-axis surface spacing D8, D13, D16, D21 is variable in value in front and back of the group. FIG. 6B shows a value of on-axis surface spacing D8, D13, D16, D21 at the wide-angle and telephoto ends as the data upon magnification change.

In the lens data of FIG. 8A, the symbol "*" attached on the left side of the surface number represents that the relevant lens surface is aspheric in form. The zoom lens of example 1 is all aspheric in form at the both surfaces S7, S8 of the lens L13 of the first lens group G1, the both surfaces S9, S10 of the lens L21 of the second lens group G2, the both surfaces S14, S15 of the lens L31 of the third lens group G3, the both surfaces S20, S21 of the lens L43 of the fourth lens group G4. In the basic lens data of FIG. 6A, there is shown a value of the radius of curvature at around the optical axis as a radius of curvature of the aspheric surfaces.

FIG. 7 shows the aspheric data concerning the zoom lens of example 1. In the value shown as aspheric data, the character "E" represents that the following number is a "power series" based on a bottom of 10 wherein the number represented by the exponential function based on a bottom 10 is multiplied on the number preceding to "E". For example, "1.0E−02" represents "$1.0 \times 10^{-2}$".

As for the aspheric data as to the zoom lens of example 1, described are values of coefficients $A_n$, KA of an aspheric form represented by the following expression (A). Specifically, Z is the length (mm) of a vertical line drawn from a point on an aspheric surface at a height with respect to the optical axis to a tangential plane on an apex of the aspheric surface (plane vertical to the optical axis).

$$Z = C \cdot h^2 / \{1 + (1 - KA \cdot C^2 \cdot h^2)^{1/2}\} + \Sigma A_n \cdot h^n \quad (A)$$

(n=integer of 3 or greater)
where
Z: depth of the aspheric surface (mm),
h: distance from the optical axis to the lens surface (height) (mm),
KA: eccentricity,
C: paraxial curvature=1/R (R: paraxial radius of curvature),
$A_n$: n-order aspheric coefficient.

The zoom lens of example 1 is expressed by properly using the order of $A_3$-$A_n$ effectively as an aspheric coefficient $A_n$.

Similarly to the zoom lens of example 1, FIGS. 8A, 8B and 9 show, as example 2, the concrete lens data corresponding to the zoom lens structure shown in FIGS. 2A and 2B. Likewise, FIGS. 10A, 10B and 11 show, as example 3, the concrete lens data corresponding to the zoom lens structure shown in FIGS. 3A and 3B. Likewise, FIGS. 12A, 12B and 13 show, as example 4, the concrete lens data corresponding to the zoom lens structure shown in FIGS. 4A and 4B. Likewise, FIGS. 14A, 14B and 15 show, as example 5, the concrete lens data corresponding to the zoom lens structure shown in FIGS. 5A and 5B.

The zoom lens in any of examples 2 to 5 is made aspheric in the surface corresponding to that of the zoom lens of example 1. The zoom lens, in examples 2, 3 and 5, is made of resin at the lens L13 of the first lens group G1, the lens L21 of the second lens group G2, the lens L31 of the third lens group G3 and the lens L43 of the fourth lens group G4, similarly to the zoom lens of example 1. The zoom lens, in example 4, is made of resin at the lens L13 of the first lens group G1, the lens L21 of the second lens group G2 and the lens L31 of the third lens group G3.

FIG. 16 shows the values concerning the foregoing conditional expressions collectively on each in the examples. As can be seen from FIG. 16, the values on each example are fallen within the numerical range as to the conditional expressions (1), (2) As to the conditional expressions (3), (4), example 1 only is fallen within the numerical range thereof. Example 1 provides a lens system using lenses of such a material with a high refractive index as satisfying the conditional expressions (3), (4), at the lens L11 of the first lens group G1 on the most object side and the lens L23 of the second lens group G2 on the most image side.

Figure 17A:
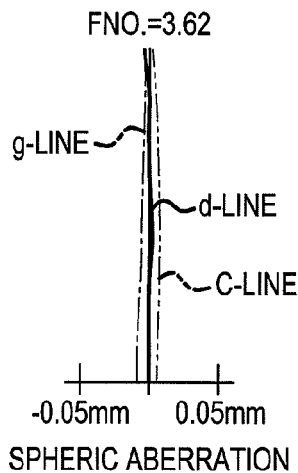
FIG. 17A shows a spheric aberration.
Figure 17B:
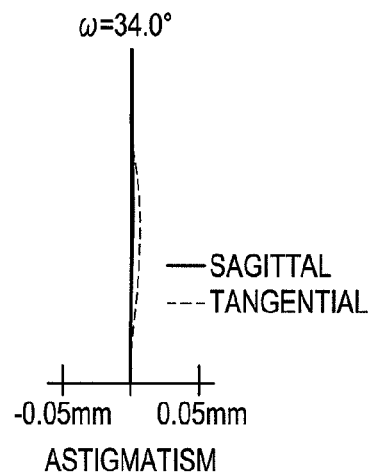
FIG. 17B shows an astigmatism and FIG. 17C a distortion.
Figure 17C:
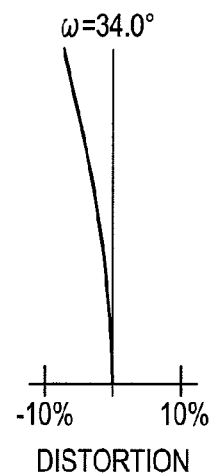
Figure 18A:
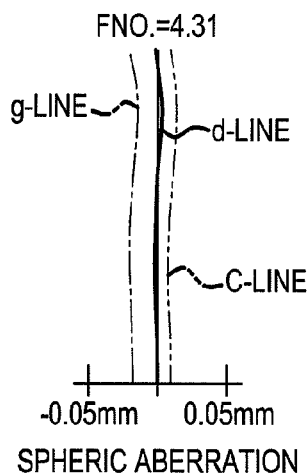
FIG. 18A shows a spheric aberration.
Figure 18B:
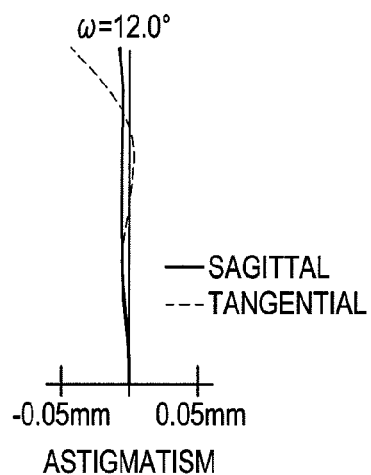
FIG. 18B shows an astigmatism and FIG. 18C shows a distortion.
Figure 18C:

FIGS. 17A to 17C respectively show the spheric aberration, the astigmatism and the distortion (distortion aberration as to the zoom lens of example 1 at the wide-angle end. FIGS. 18A to 18C respectively show similarly the aberrations at the telephoto end. In the aberration diagrams, aberrations are shown based on d-line (587.6 nm) as a basic wavelength. In the aberration diagrams, aberrations at g-line (wavelength: 435.8 nm) and C-line (wavelength: 656.3 nm) are also shown. In the aberration diagrams, the solid line shows an aberration in the sagittal direction while the broken line is an aberration in the tangential direction.

Figure 19A:
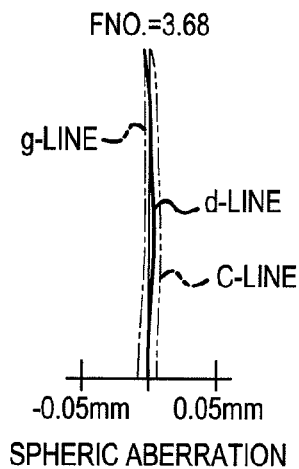
FIG. 19A shows a spheric aberration.
Figure 19B:
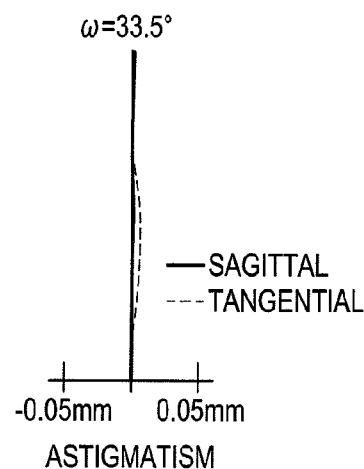
FIG. 19B shows an astigmatism and FIG. 19C shows a distortion.
Figure 19C:
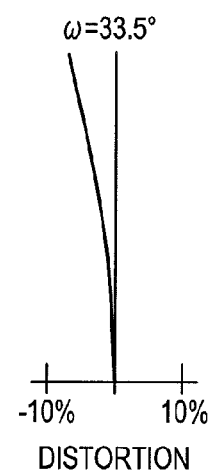
Figure 20A:
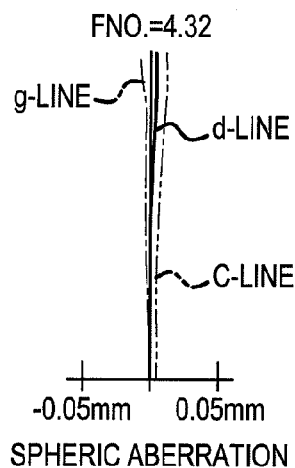
FIG. 20A shows a spheric aberration.
Figure 20B:
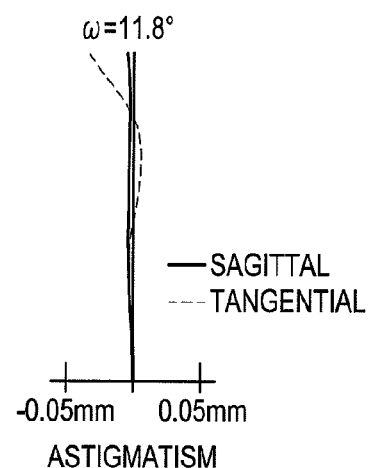
FIG. 20B shows an astigmatism and FIG. 20C shows a distortion.
Figure 20C:
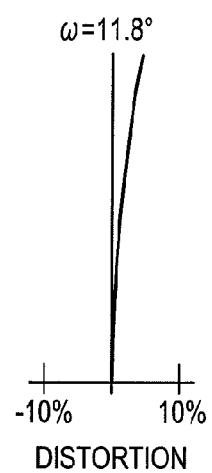
Figure 21A:
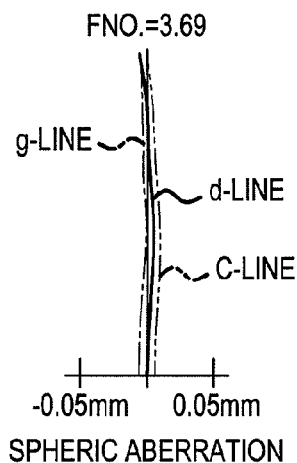
FIG. 21A shows a spheric aberration.
Figure 21B:
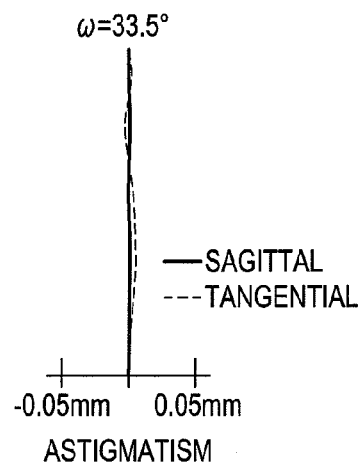
FIG. 21B shows an astigmatism and FIG. 21C shows a distortion.
Figure 21C:
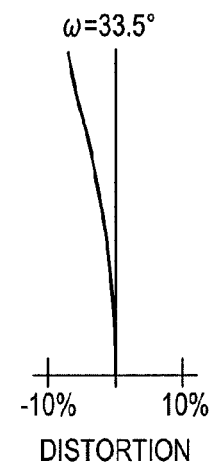
Figure 22A:
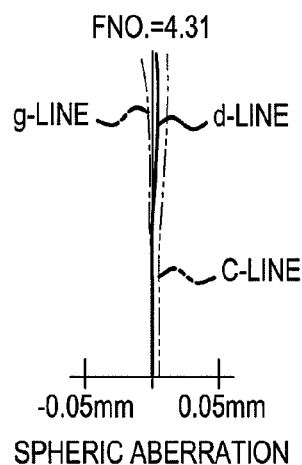
FIG. 22A shows a spheric aberration.
Figure 22B:
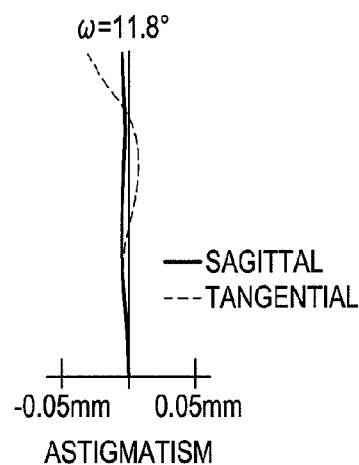
FIG. 22B shows an astigmatism and FIG. 22C a distortion.
Figure 22C:
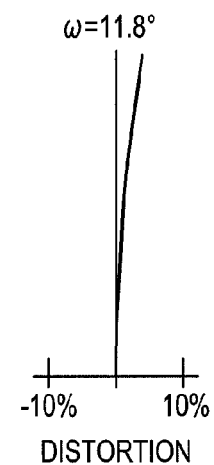
Figure 23A:
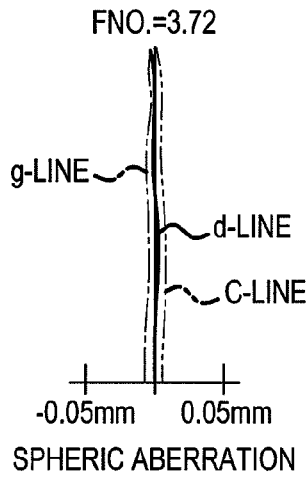
FIG. 23A shows a spheric aberration.
Figure 23B:
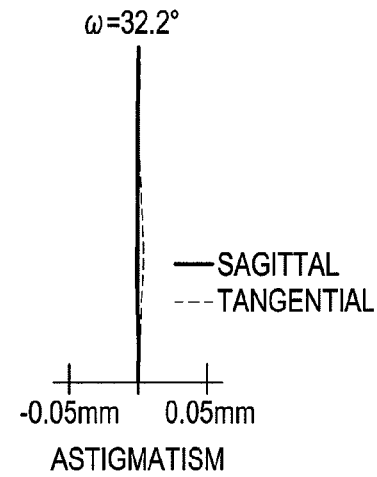
FIG. 23B shows an astigmatism and FIG. 23C shows a distortion.
Figure 23C:
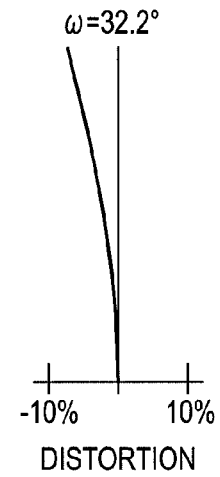
Figure 24A:
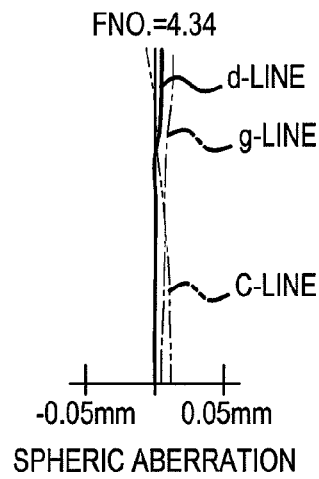
FIG. 24A shows a spheric aberration.
Figure 24B:
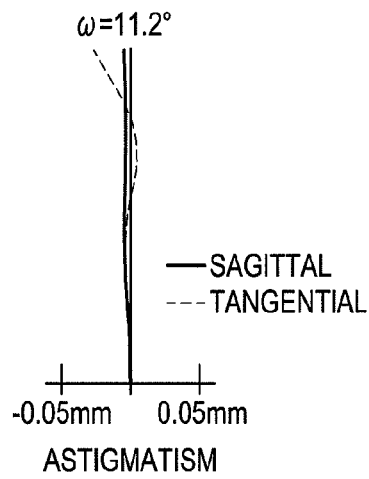
FIG. 24B shows an astigmatism and FIG. 24C shows a distortion.
Figure 24C:
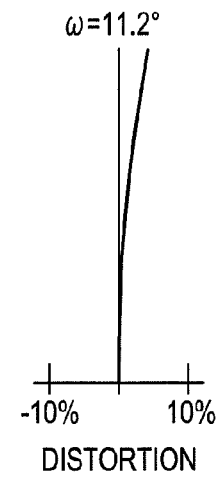
Figure 25A:
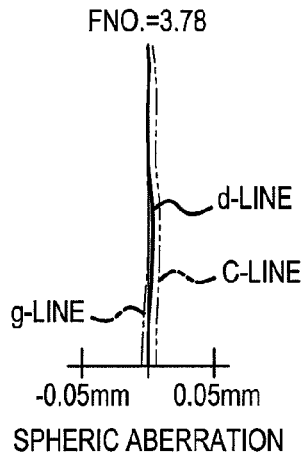
FIG. 25A shows a spheric aberration.
Figure 25B:
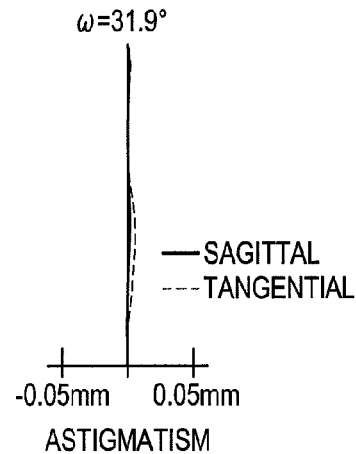
FIG. 25B shows an astigmatism and FIG. 25C shows a distortion.
Figure 25C:
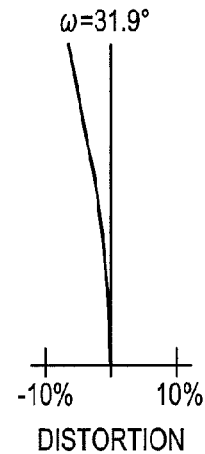
Figure 26A:
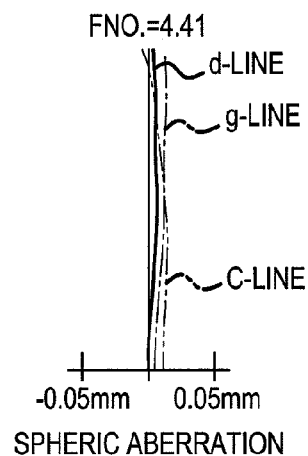
FIG. 26A shows a spheric aberration.
Figure 26B:
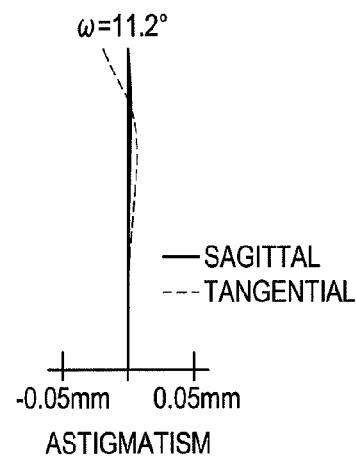
FIG. 26B shows an astigmatism and FIG. 26C shows a distortion.
Figure 26C:
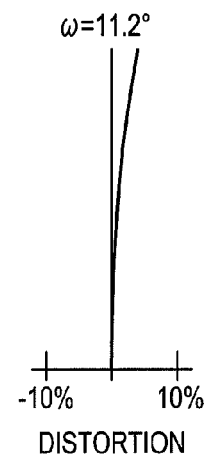

Likewise, as to the zoom lens of example 2, FIGS. 19A to 19C respectively show aberrations (at the wide-angle end) while FIGS. 20A to 20C respectively show those (at the telephoto end) . Likewise, as to the zoom lens of example 3, FIGS. 21A to 21C respectively show aberrations (at the wide-angle end) while FIGS. 22A to 22C respectively show those (at the telephoto end). As to the zoom lens of example 4, FIGS. 23A to 23C respectively show aberrations (at the wide-angle end) while FIGS. 24A to 24C respectively show those (at the telephoto end). As to the zoom lens of example 5, FIGS. 25A to 25C respectively show aberrations (at the wide-angle end) while FIGS. 26A to 26C respectively show those (at the telephoto end).

As can be understood from the above numerical data and aberration diagrams, aberrations are well corrected on each of the examples, thus realizing a zoom lens reduced of cost by suitably possessing resin lenses in the groups while maintaining the size small and the optical characteristics well.

The invention is not limited to the foregoing embodiment and examples but can be modified in various ways. For example, as for the values of radius of curvature, on-axis surface spacing, refractive index, etc. of the lens components are not limited to the values indicated in the numerical examples but can take other values.

Meanwhile, the invention is not limited to the zoom lens wholly in a four-group structure but to be applied for a zoom lens having five lens groups or more.

According to the zoom lens of the invention, a bending optical system is structured advantageous in terms of size reduction and using suitably resin lenses at least in the first and second lens groups. This can achieve cost reduction while maintaining the size small and the optical characteristics well.

Meanwhile, according to the imager apparatus of the invention, the zoom lens of the invention is used as an imaging lens which is small in size, low in cost and high in performance. Thus, the apparatus wholly can be reduced in size and cost while maintaining the imaging performance well.

The entire disclosure of each and every foreign patent application from which the benefit of foreign priority has been claimed in the present application is incorporated herein by reference, as if fully set forth.

What is claimed is:

1. A zoom lens comprising a first lens group, a second lens group, a third lens group and a fourth lens groups in order from an object side, so as to change magnification by changing a spacing between the lens groups, wherein the first lens group has a positive refractive power as a whole and comprises, in order from the object side, a negative meniscus lens, a reflecting member that bends an optical path nearly 90 degrees and a positive lens of a resin material having at least one aspheric surface;

the second lens group has a negative refractive power as a whole and comprises a negative lens of a resin material on an most object side of the second lens group;

the third lens group has a positive lens having a convex surface directed to the object side; and the fourth lens group has a positive refractive power as a whole and comprises an aspheric lens having at least one aspheric surface;

wherein a conditional expression given below is satisfied;

$$1.0 < |P1/P2| < 3.0 \quad (1)$$

where
P1: focal length of the positive lens of the resin material in the first lens group, and
P2: focal length of the negative lens of the resin material in the second lens group.

2. The zoom lens of claim 1, further satisfying a conditional expression given below:

$$0.8 < |f2/fw| < 1.2 \quad (2)$$

where fw: focal length of the zoom lens at a wide-angle end, and
f2: focal length of the second lens group.

3. The zoom lens of claim 1, further satisfying a conditional expression given below:

$$2.1 < Nd1 \quad (3)$$

where

Nd1: refractive index, at d-line, of the negative meniscus lens on the most object side within the first lens group.

4. The zoom lens of claim 1, further satisfying a conditional expression given below:

$$2.1 < Nd7 \quad (4)$$

where

Nd7: refractive index, at d-line, of the lens on the most image side within the second lens group.

5. The zoom lens of claim 1,
wherein the aspheric lens in the fourth lens group is a positive or negative meniscus lens, arranged on an most image side within the fourth lens group, that has at least one aspheric surface.

6. The zoom lens of claim 1,
wherein the positive lens of the third lens group is formed of a resin material.

7. The zoom lens of claim 1,
wherein the aspheric lens of the fourth lens group is formed of a resin material.

8. An imager apparatus comprising;
the zoom lens of claim 1; and
an imaging device that outputs an imaging signal commensurate with an optical image formed by the zoom lens.

9. The zoom lens of claim 2, further satisfying a conditional expression given below:

$$2.1 < Nd1 \quad (3)$$

where

Nd1: refractive index, at d-line, of the negative meniscus lens on the most object side within the first lens group.

10. The zoom lens of claim 9, further satisfying a conditional expression given below:

$$2.1 < Nd7 \quad (4)$$

where

Nd7: refractive index, at d-line, of the lens on the most image side within the second lens group.

11. The zoom lens of claim 10,
wherein the aspheric lens in the fourth lens group is a positive or negative meniscus lens, arranged on an most image side within the fourth lens group, that has at least one aspheric surface.

12. The zoom lens of claim 11,
wherein the positive lens of the third lens group is formed of a resin material.

13. The zoom lens of claim 12,
wherein the aspheric lens of the fourth lens group is formed of a resin material.

14. An imager apparatus comprising:
the zoom lens of claim 13; and
an imaging device that outputs an imaging signal commensurate with an optical image formed by the zoom lens.

15. The zoom lens of claim 5, wherein the aspheric lens of the fourth lens group is formed of a resin material.

* * * * *